United States Patent [19]

Hillis

[11] Patent Number: 5,388,262
[45] Date of Patent: * Feb. 7, 1995

[54] METHOD AND APPARATUS FOR ALIGNING THE OPERATION OF A PLURALITY OF PROCESSORS

[75] Inventor: W. Daniel Hillis, Brookline, Mass.

[73] Assignee: Thinking Machines Corporation, Cambridge, Mass.

[ * ] Notice: The portion of the term of this patent subsequent to Jun. 22, 2010 has been disclaimed.

[21] Appl. No.: 53,979

[22] Filed: Apr. 26, 1993

Related U.S. Application Data

[60] Division of Ser. No. 530,484, May 29, 1990, Pat. No. 5,222,237, which is a continuation of Ser. No. 151,386, Feb. 2, 1988, abandoned.

[51] Int. Cl.$^6$ ............................................. G06F 15/16
[52] U.S. Cl. ..................... 395/650; 395/800; 395/375; 371/36; 364/DIG. 1; 364/228.7; 364/229; 364/229.1; 364/262.4; 364/262.7; 364/271; 364/271.2; 364/271.3; 364/281.3
[58] Field of Search ............... 395/650, 800, 575, 375; 371/19, 36, 47, 47.1

[56] References Cited

U.S. PATENT DOCUMENTS

| | | | |
|---|---|---|---|
| 3,651,482 | 3/1972 | Benson et al. | 364/DIG. 1 X |
| 3,753,234 | 8/1973 | Gilbert et al. | 364/DIG. 1 X |
| 3,810,119 | 5/1974 | Zieve et al. | 364/DIG. 1 X |
| 4,229,790 | 10/1980 | Gilliland et al. | 364/DIG. 1 X |
| 4,330,826 | 5/1982 | Whiteside et al. | 395/550 |
| 4,344,134 | 8/1982 | Barnes | 395/800 |
| 4,392,196 | 7/1983 | Glenn et al. | 395/550 |
| 4,394,725 | 7/1983 | Bienvenu et al. | 395/375 |
| 4,399,504 | 8/1983 | Obermarck et al. | 395/650 |
| 4,554,626 | 11/1985 | Katz et al. | 395/650 |
| 4,598,400 | 7/1986 | Hillis | 370/60 |
| 4,663,708 | 5/1987 | Taub | 364/DIG. 1 X |
| 4,733,353 | 3/1988 | Jaswa | 364/DIG. 1 X |
| 4,775,934 | 10/1988 | Houri et al. | 364/DIG. 1 X |
| 4,833,638 | 5/1989 | Vollaro | 364/DIG 2 X |
| 5,056,000 | 10/1991 | Chang | 364/DIG. 1 X |
| 5,222,237 | 6/1993 | Hillis | 395/650 |

OTHER PUBLICATIONS

Requa et al, "The Piecewise Data Flow Architecture: Architectural Concepts," *IEEE Transactions on Computers*, vol. C-32, No. 5, May 1983.

P. Tang, et al., "Processor Self-Scheduling for Multiple-Nested Parallel Loops", Proc. Int'l Conf. on Parallel Processing, Aug. 1986, pp. 528-535.

R. Gupta, "The Fuzzy Barrier: A Mechanism for High Speed Synchronization of Processors", Proc. Third Int'l Conf on Architectural Support for Programming Languages and Operating Systems, Apr. 1989 pp. 54-63.

*Primary Examiner*—Paul V. Kulik
*Attorney, Agent, or Firm*—Richard A. Jordan

[57] ABSTRACT

A method and apparatus are disclosed for aligning a plurality of multi-processors. The apparatus preferably comprises an alignment unit associated with each processor and a logic network for combining the output of the alignment unit and for broadcasting information to these units. Alignment is achieved by inserting in the instruction stream from each processor that is to be aligned a request for alignment, by testing for prior completion of any instructions that must be completed and by causing all processors to wait until they have all made the request for alignment and completed necessary prior instructions. The alignment unit associated with each processor monitors the instruction stream to detect a request for alignment. The logic network illustratively is an array of AND gates that tests each alignment unit to determine if it has detected a request for alignment. When all the units have made such a request, the logic network informs the alignment units; and the alignment units inform the processors.

15 Claims, 4 Drawing Sheets

METHOD AND APPARATUS FOR ALIGNING THE OPERATION OF A PLURALITY OF PROCESSORS

This application is a divisional of U.S. patent application Ser. No. 07/530,484, filed May 29, 1990, now U.S. Pat. No. 5,222,237 which is a continuation of U.S. patent application Ser. No. 07/151,386, filed Feb. 2, 1988, now abandoned.

BACKGROUND OF THE INVENTION

This relates to multi-processors and in particular to a system for aligning the operation of a plurality of processors in a multi-processor.

Numerous multi-processors are known in the art. See Wang, A. and Brigg, F. A., *Computer Architecture in Parallel Processing*, (McGraw Hill, 1984). Illustrative such systems include the Illiac-IV, the Burroughs Scientific Processor (BSP) manufactured by Burroughs Corporation (now Unisys), the Massively Parallel Processor (MPP) developed at the NASA Goddard Space Flight Center and manufactured by Goodyear Aerospace, the DAP manufactured by ICL of England, the STARAN designed by Goodyear Aerospace, the IBM 370/168 MP and IBM 3081/3084 both manufactured by International Business Machines, the Univac 1100/80 manufactured by Sperry Univac (now Unisys), Tandem-16 Nonstop, D-825 manufactured by Burroughs Corporation (now Unisys), the HEP manufactured by Denelcor Inc., the Cray X-MP and Cray-2 each manufactured by Cray Research Inc., and the Cm* and C.mmp, each developed at Carnegie Mellon University.

Recently, multi-processors have been introduced in which thousands of processors are operated in parallel. One such processor is the Connection Machine Computer being manufactured and sold by the assignee of the present application and described more fully in U.S. Pat. No. 4,589,400, which is incorporated herein by reference. The Connection Machine Computer comprises a central computer, a microcontroller, and an array of as many as 65,536 parallel processors in presently available embodiments. The central computer may be a suitably programmed commercially available computer such as a Symbolics 3600- series LISP Machine. The microcontroller is an instruction sequencer of conventional design for generating a sequence of instructions that are applied to the array of parallel processors by means of a thirty-two bit parallel bus. The microcontroller receives from the parallel processing array a signal which is a general purpose or GLOBAL signal that can be used for data output and status information.

Common to all multi-processors are problem of synchronizing the operations of the multi-processor so as to make it possible for individual multi-processors to exchange information. These problems can be avoided by operating all the processors of the multi-processor in a single instruction stream, multiple data stream (SIMD) environment in which all processing units receive the same instruction stream in parallel although they operate on different data. It is advantageous, however, to be able to operate the processors of a multi-processor independently to the extent that each processor operates on its own instruction stream in a multiple instruction stream, multiple data stream (MIMD) environment.

Synchronization may be effected by having each processor set a bit in a register when the processor reaches a point in its program where it is to be aligned with other processors. Upon reaching this synchronizatopm point, each processor tests the register to determine if all bits have been properly set and no processor goes forward in its program until all such bits have been set. As a result of this technique, processors may be brought into strict time synchronization such that at each synchronization point each processor performs a predetermined operation at the same time.

SUMMARY OF THE INVENTION

In many operations, it is not necessary to achieve strict time synchronization in the operations of a plurality of processors. Rather it is sufficient to ensure simply that each processor has performed a specified task before any processor can initiate another specified task. This less strict form of synchronization is referred to herein as alignment. In accordance with the invention, a method and apparatus have been devised for aligning a plurality of multi-processors. The apparatus preferably comprises an alignment unit associated with each processor and a logic network for combining the output of the alignment units and for broadcasting information to these units. Alignment is achieved by inserting in the instruction stream from each processor that is to be aligned a request for alignment and by causing all such processors to wait until they have all made the request for alignment and completed any necessary operations.

The alignment unit associated with each processor monitors the instruction stream to detect a request for alignment. The logic network illustratively is an array of AND gates that tests each alignment unit to determine if it has detected a request for alignment and tests the processors and/or their interconnection network to determine if all necessary operations have been completed. When all the units have made such a request and all necessary operations have been completed, the logic network informs the alignment units; and the alignment units inform the processors.

BRIEF DESCRIPTION OF THE DRAWINGS

These and other objects, features and advantages of the invention will become more readily apparent from the following detailed description of the invention in which.

DETAILED DESCRIPTION OF THE INVENTION

Figure 1:
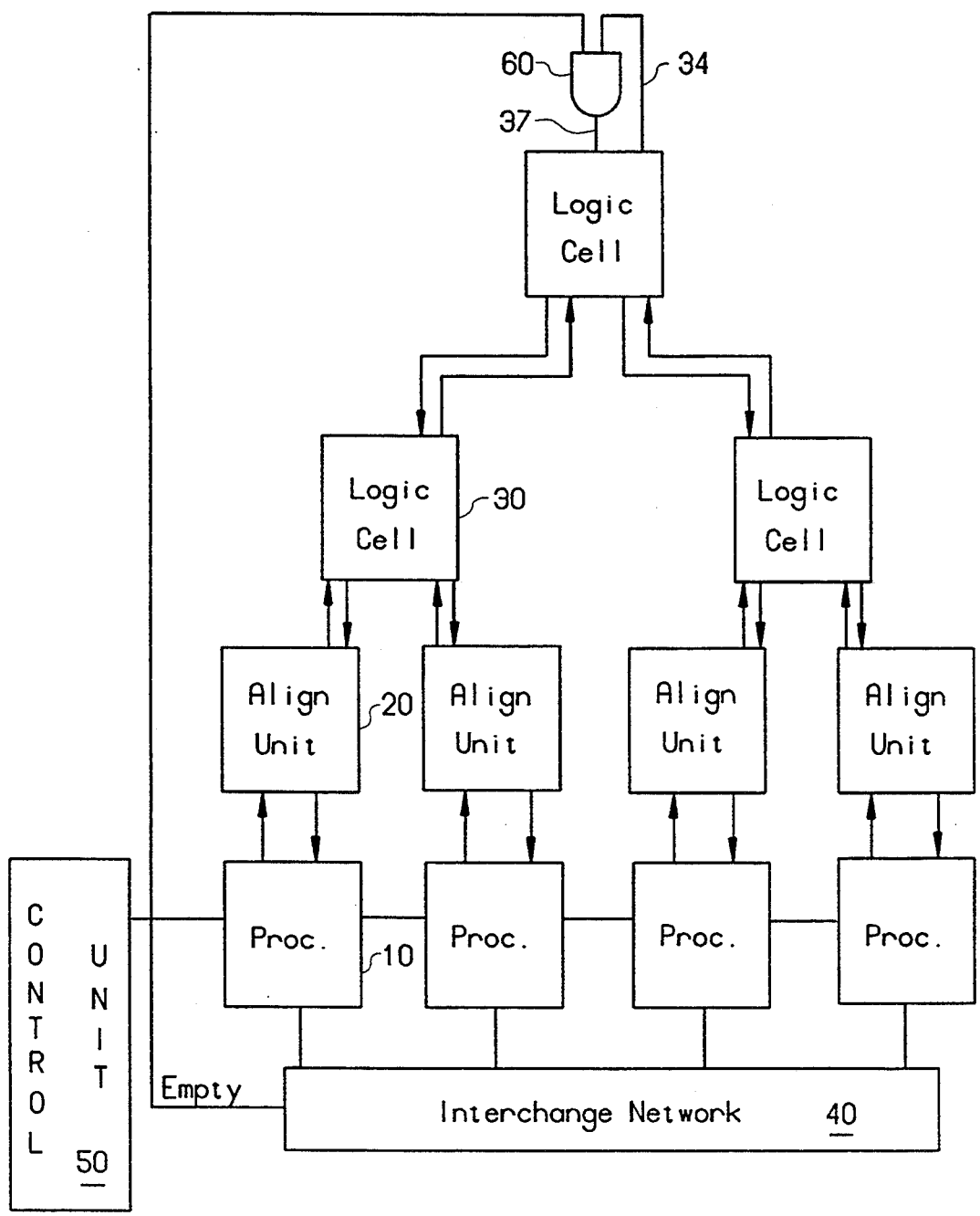
FIG. 1 is a block diagram illustrating an illustrative embodiment of a multi-processor which incorporates the invention.

As shown in FIG. 1, illustrative apparatus of the present invention comprises an array of processors 10, an array of alignment units 20, an array of combinatorial logic cells 30, an interconnection network 40 and a control unit 50. Illustratively, each processor includes an arithmetic/logic unit, a read/write memory, and input and output means. Numerous such processors are well known in the art. Illustratively, each processor is an 80386-type microprocessor such as that made by Intel Corporation.

Interconnection network 40 provides for communication between the processors. In particular, it permits the exchange of data and control information between one processor and another. Numerous interconnection networks are known in the art. See for example Wu, C. and Feng, T., *Tutorial: Interconnection Network for Parallel and Distributed Processing* (IEEE, 1984). Illustrative communication networks are arrangements which connect each processor to its nearest neighbor in an orthogonal array of two or more dimensions. Two such networks are described in the above referenced '400 patent and numerous others are known in the art.

The processors and interconnection network are typically operated under the control of some type of control unit 50. In the case of the processors and interconnection network of the Connection Machine Computer, an illustrative control unit is a Symbolics 3600 Series LISP machine and a microcontroller. Numerous other control units are used with other multi-processors.

If there is communication among the processors of a multi-processor, it may be necessary to assure that one processor has reached a certain step in its operation before another processor can perform a specified operation. For example, if data is to be fetched from a first processor to a second, it is necessary to ensure that the data be in the first processor before the fetch occurs. To ensure that the data is there when needed, it is necessary to align the individual processors. This can be achieved by operating all the processors strictly in parallel in a SIMD environment. However, in many cases it may be advantageous to operate the processors in a MIMD environment and align only where needed.

In accordance with the invention, alignment is achieved among a group of processors by inserting in the instruction stream of each of these processors two additional instructions: a request for alignment and a test if alignment has been achieved. Typically, the request for alignment instruction is issued at or after the time the instruction stream issues an instruction (such as a communication instruction) which will require the processors to be in alignment at some later time; and the test instruction is issued immediately before the point in the instruction stream where alignment must have been achieved.

For example, let us assume that data is to be transferred from each processor in a group of processors to its neighboring processor and combined with data at that processor. If we identify a pair of neighboring processors in the group of processors as processor i-1 and processor i, the following instruction stream may be provided to each processor in the group to combine such data at each processor:

01 Send Data from Processor i-1 to Register A of Processor i
02 Move Data from Register B to Register C of Processor i
03 Add Contents of Register A to Contents of Register C of Processor i It is clearly necessary that the proper data be in Register A before it is added to the contents of Register C. To ensure this, it is necessary to align the operations of the processors.

In accordance with the present invention, such alignment is accomplished by inserting request and test instructions in the instruction stream so that for the above example the instruction stream is as follows:

01 Send Data from Processor i-1 to Register A of Processor i
02 Request alignment
03 Move Data from Register B to Register C of Processor i
04 Test if aligned
05 If false, reexecute Test
06 If true, Add Contents of Register A to Contents of Register C of Processor i In accordance with the invention, the request and test instructions are inserted in the instruction stream from each processor to be aligned and all the processors wait at the test instruction until all the processors have asserted the request instruction.

Figure 2:
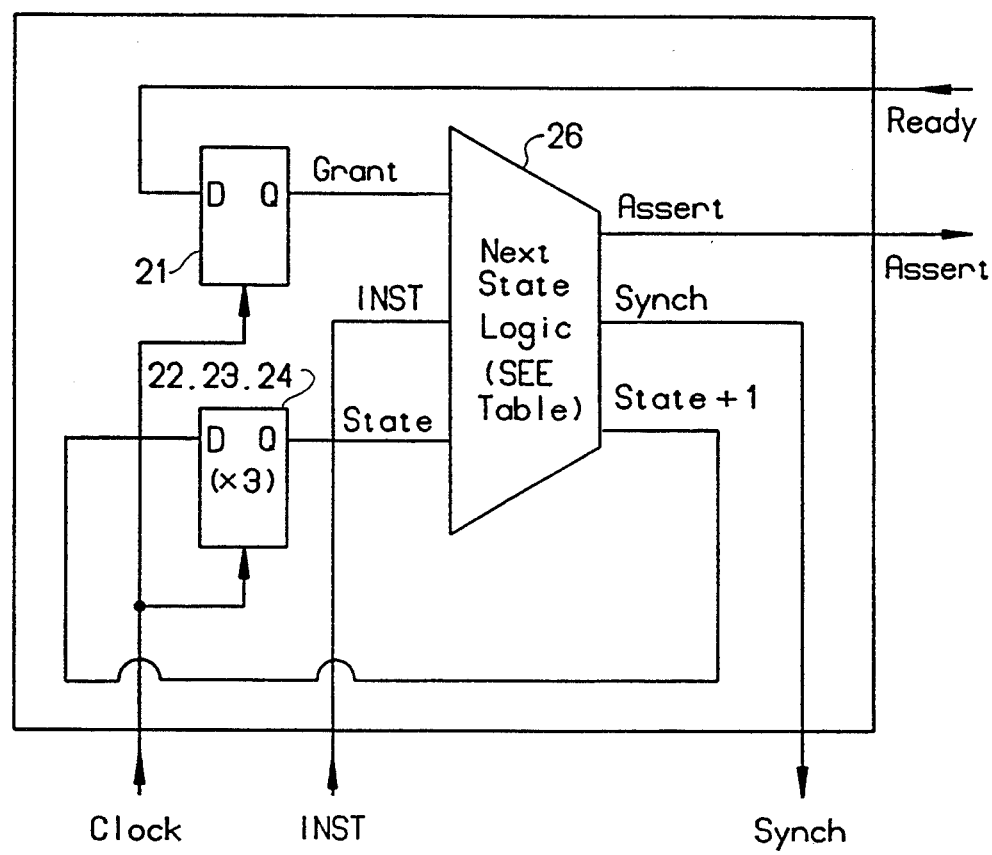
FIG. 2 is a block diagram illustrating an illustrative embodiment of the alignment unit of the present invention.
Figure 3:
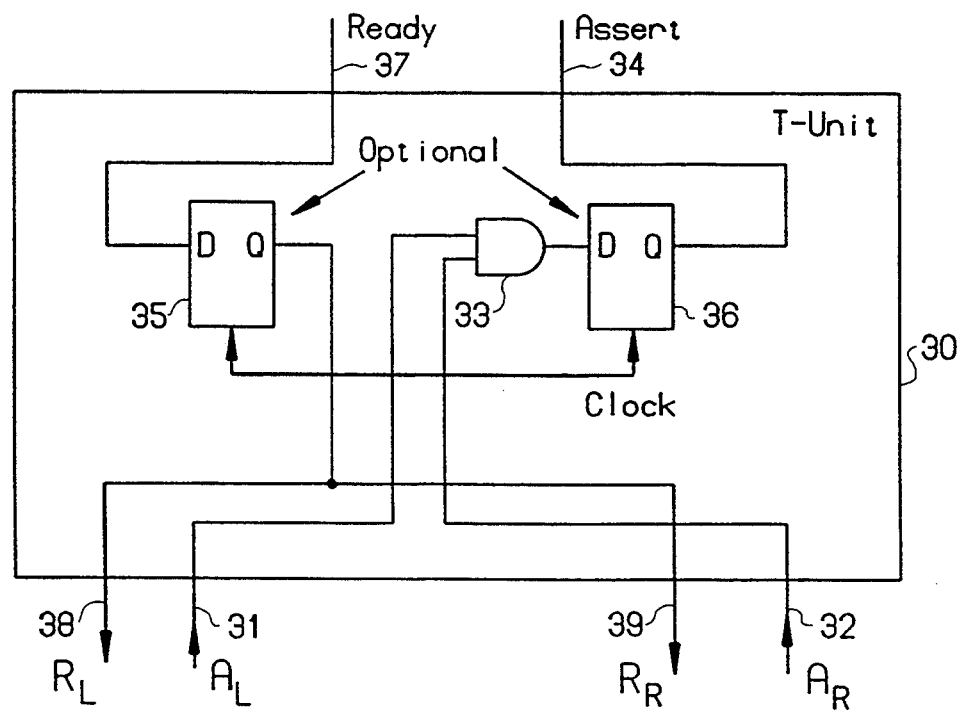
FIG. 3 is an illustrative embodiment of a unit of combinatorial logic of the present invention.

Preferred apparatus for processing such request and test instructions comprises alignment units 20 and combinatorial logic cells 30 of the apparatus of FIG. 1. As shown in FIG. 1, each processor 10 is connected to an alignment unit so as to provide signals to such unit and to receive signals from it. As depicted in FIG. 2, each alignment unit 20 comprises four D-type flip flops 21, 22, 23, 24 and combinatorial logic 26 which implements the input/output table set forth in Table I. As shown in FIG. 3, each logic cell 30 comprises an AND gate 33 and optionally two D-type flip flops 35, 36. The logic cells are connected in the form of a binary tree with each logic cell in the lowest level of the tree being connected to a pair of alignment units 20.

TABLE I

| INPUTS | | | OUTPUTS | | |
|---|---|---|---|---|---|
| State | INST | GRANT | State + 1 | ALIGN | ASSERT |
| IDLE | TEST | LOW | ERROR | X | X |
| IDLE | TEST | HIGH | ERROR | X | X |
| IDLE | REQ | LOW | PEND | LOW | LOW |
| IDLE | REQ | HIGH | ERROR | X | X |
| IDLE | OTHER | LOW | IDLE | LOW | LOW |
| IDLE | OTHER | HIGH | ERROR | X | X |
| PEND | TEST | LOW | PEND | LOW | HIGH |
| PEND | TEST | HIGH | BLOCK | HIGH | HIGH |
| PEND | REQ | LOW | ERROR | X | X |
| PEND | REQ | HIGH | ERROR | X | X |
| PEND | OTHER | LOW | PEND | LOW | HIGH |
| PEND | OTHER | HIGH | GOT | HIGH | HIGH |
| GOT | TEST | LOW | IDLE | HIGH | LOW |
| GOT | TEST | HIGH | BLOCK | HIGH | LOW |
| GOT | REQ | LOW | ERROR | X | X |
| GOT | REQ | HIGH | ERROR | X | X |
| GOT | OTHER | LOW | SAVE | HIGH | LOW |
| GOT | OTHER | HIGH | GOT | HIGH | LOW |
| SAVE | TEST | LOW | IDLE | HIGH | LOW |
| SAVE | TEST | HIGH | ERROR | X | X |
| SAVE | REQ | LOW | ERROR | X | X |
| SAVE | REQ | HIGH | ERROR | X | X |
| SAVE | OTHER | LOW | SAVE | HIGH | LOW |
| SAVE | OTHER | HIGH | ERROR | X | X |
| BLOCK | TEST | LOW | ERROR | X | X |
| BLOCK | TEST | HIGH | ERROR | X | X |
| BLOCK | REQ | LOW | PEND | LOW | LOW |
| BLOCK | REQ | HIGH | QUEUE | LOW | LOW |
| BLOCK | OTHER | LOW | IDLE | LOW | LOW |
| BLOCK | OTHER | HIGH | BLOCK | LOW | LOW |
| QUEUE | TEST | LOW | PEND | LOW | LOW |
| QUEUE | TEST | HIGH | QUEUE | LOW | LOW |
| QUEUE | REQ | LOW | ERROR | X | X |
| QUEUE | REQ | HIGH | ERROR | X | X |
| QUEUE | OTHER | LOW | PEND | LOW | LOW |
| QUEUE | OTHER | HIGH | QUEUE | LOW | LOW |

Each alignment unit receives from the processor to which it is connected the instruction stream INST being executed by the processor. In accordance with the input/output table of Table I as described more fully below, each alignment unit provides to its processor a signal ALIGN indicating whether or not alignment has been achieved. In addition, each alignment unit also provides an output signal ASSERT to an input of the logic cell to which it is connected and it receives from that logic cell a READY signal which is applied to flip-flop 21 and then to combinatorial logic 26.

AND gate 33 of logic cell 30 receives ASSERT signals on input lines 31, 32 and produces an output ASSERT signal on output line 34 (optionally, via flip-flop 36). In the specific embodiment of the invention shown in FIG. 3, a logic high signal is not asserted on an output line 34 until logic high signals are assorted on both input signal lines 31, 32 to AND gate 33. The output ASSERT signals from two cells are applied as the two inputs to a logic cell 30 in the next higher level of the binary tree.

The uppermost cell in the AND tree has an output line 34 which is input to an AND gate 60 along with a signal from interconnection network 10 which indicates that the interconnection network is empty. The network is empty whenever there are no messages being routed through the network. A test for this condition is conventional in some interconnection networks and the provision of a signal indicating that the network is empty is within the ordinary skill of the art. In the preferred embodiment shown in FIG. 1, a test for an empty network is made to ensure that message traffic on the interconnection network is completed.

Upon coincidence of a logic high empty signal and a logic high signal on the assert output 34 of the uppermost cell, a ready signal is applied by AND gate 60 to an input ready line 37 to the uppermost cell of the binary tree. This signal is provided to two output ready lines 38, 39 (optionally, via flip-flop 35) which are connected respectively to the input ready lines of two cells in the next lower level of the binary tree. At the lowest level of the binary tree, the READY signal is provided by each cell to two alignment units 20 so that the READY signal is broadcast to the entire array of alignment units 20.

In general, the operation of alignment units 20 and logic cells 30 is such that a logic high signal is output on the ASSERT line from an alignment unit when that unit detects a REQUEST for alignment signal in the instruction stream received at the alignment unit. If and only if each alignment unit detects a REQUEST for alignment signal, output line 34 from the uppermost logic cell 30 in the binary tree will be logic high. If message traffic on processor interconnection network 10 is completed at some point after all the processors issue a REQUEST for alignment, then the empty signal will become logic high as well and the output of AND gate 60 will become logic high. As a result, a logic high READY signal will be broadcast down through logic cells 30 to all the alignment units where the logic high READY signal is recognized as a GRANT signal.

The GRANT signal is processed by each alignment unit so as to output to the processor a single logic high ALIGN instruction for each TEST instruction in the instruction stream from the processor. If the GRANT signal is received before the TEST signal in the instruction stream, each alignment unit simply stores the GRANT signal and waits. If the TEST signal is received first, the alignment unit likewise just waits. Upon receipt of both TEST and GRANT signals, the alignment unit issues a logic high ALIGN signal to the processor, and the processor is then enable to perform the operation for which alignment was required.

Figure 4:
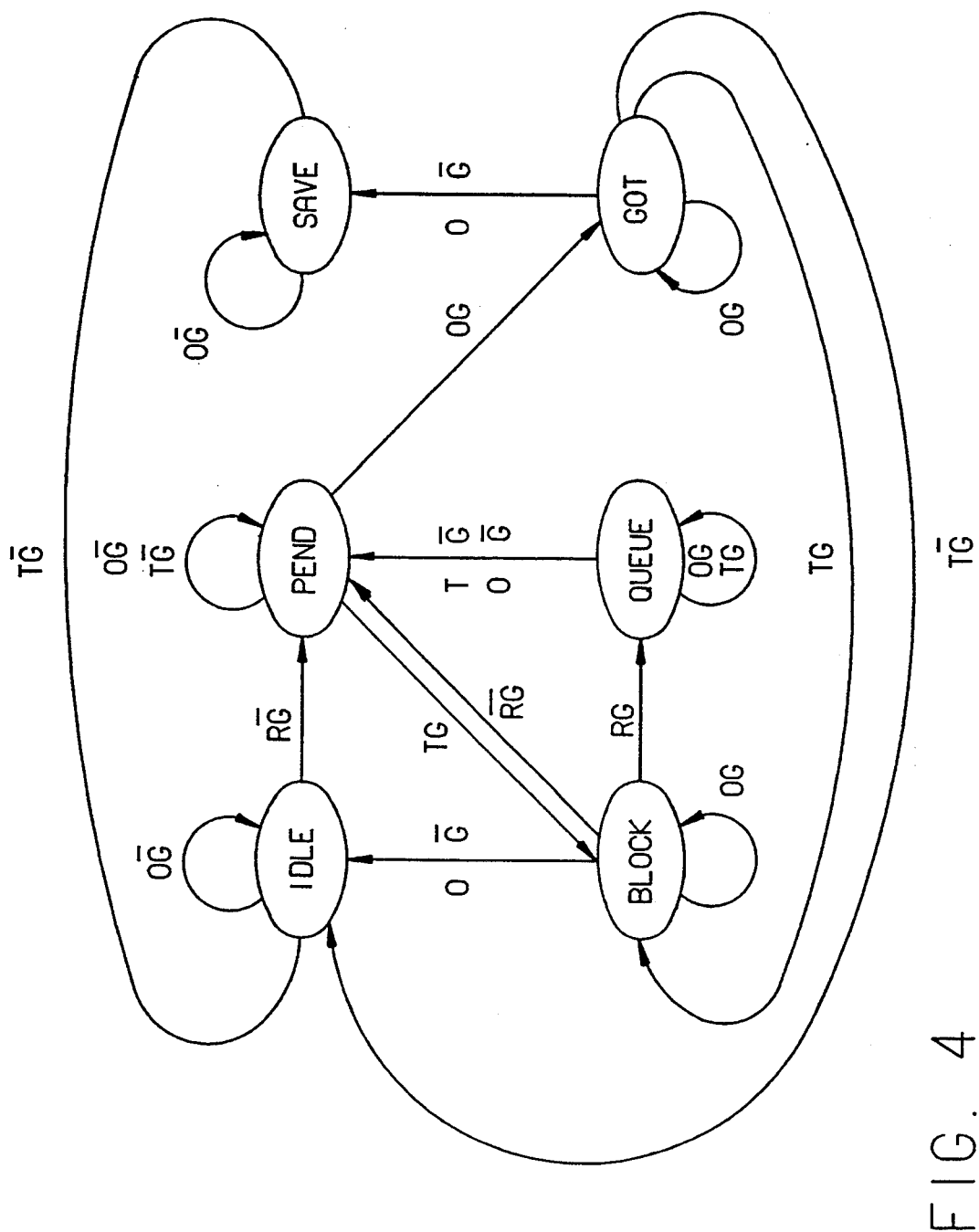
FIG. 4 is a state diagram illustrating the operation of the alignment unit of FIG. 2.

Further details of the operation of the alignment unit are best explained in conjunction with Table I and the state diagram of FIG. 4, which depict the operation of alignment unit 20 and its combinatorial logic 26 and flip-flops 22-24. As shown in FIG. 4, the alignment unit can be in any one of six states: IDLE, PENDING, BLOCKING, QUEUE, GOT and SAVE. The state of the alignment unit is stored in binary encoded form in flip-flops 22, 23, 24 and is provided as an input to combinatorial logic 26 along with the instruction stream INST from the processor and the GRANT signal from flip-flop 21. The instruction stream is the sequence of instructions that is provided to the processor and, in accordance with the invention includes three types of instructions; REQUEST for alignment, TEST, and all OTHER instructions which are represented in FIG. 4 by the symbols R, T and O respectively. The logic high GRANT signal is represented in FIG. 4 by G and the logic low GRANT signal by $\overline{G}$.

The different combinations of inputs to combinatorial logic 26 are set forth in the three left-hand columns of Table I. The outputs produced by combinatorial logic 26 in response to these inputs are set forth in the three right-hand columns of Table I. As indicated, one output specifies the next state of the alignment unit and the other two specify the logic level of the ALIGN and ASSERT lines. In cases where some combination of inputs is not possible, the next state has been indicated to be an ERROR and the ALIGN and ASSERT levels have been left undefined.

The apparatus of FIG. 1 is initialized so that the alignment units are in the IDLE state. Ordinarily, each alignment unit is in the IDLE state and remains so upon receipt of any instruction in the instruction stream from the processor except for a REQUEST instruction. This is indicated by the loop labelled $O\overline{G}$. While in the IDLE state both the ALIGN and ASSERT outputs are logic low. The alignment unit changes to the PENDING state upon receipt of a REQUEST signal as detailed below; and in the PENDING state causes the ASSERT output to be logic high. If and when the ASSERT outputs of all the alignment units become logic high and the interconnection network is empty, the GRANT signal will become logic high and causing the GRANT signal to be logic high each alignment unit will producing output signals as specified in Table I. The alignment unit will ultimately return to the IDLE state if a TEST instruction and a logic low GRANT signal are received.

As indicated, if a REQUEST signal is detected in the instruction stream and if a logic high GRANT signal has not been received from the logic cells, the alignment unit changes from the IDLE state to the PENDING state as indicated by the line $R\overline{G}$ in FIG. 4 and the third line of Table I. Once in the PENDING state, the alignment unit will stay there unless a logic high GRANT signal is received. While in the PENDING state, combinatorial logic 26 will issue a logic high ASSERT signal for any of the possible combination of input signals. The ASSERT signals are applied to the inputs to logic cells 30; and if all the ASSERT signals are logic high and if the connection network is empty a logic high READY will be broadcast to all the alignment units indicating that all the processors have completed the instruction (such as a communication instruction) they were required to complete and accordingly are aligned. This logic high READY signal is the logic high GRANT signal of Table I. If a logic high GRANT signal is received along with an OTHER instruction, the unit changes to the GOT state as indicated by the line OG in FIG. 4 and the twelfth line of Table I and issues a logic high ALIGN signal while continuing to issue a logic high ASSERT signal.

If any OTHER instruction continues to be received and the GRANT signal continues to be logic high, the combinatorial logic remains in the GOT state, but drops the ASSERT signal to logic low which causes the GRANT signal to become logic low. If the GRANT signal is logic low while an OTHER instruction is received, the alignment unit switches to the SAVE state where it remains until a TEST instruction is received and then returns to the IDLE state.

If, however, a TEST instruction is received while the unit is in the GOT state, the unit changes to the BLOCKING state if the GRANT signal is logic high or to the IDLE state if the GRANT signal is logic low and causes the ASSERT signal to become logic low.

The BLOCKING state prevents other alignment operations from being performed. Upon receipt of any OTHER instruction at the alignment unit while it is in the BLOCKING state and the GRANT signal is low, the unit returns to the IDLE state as indicated by the line $\overline{OG}$ between the BLOCKING and IDLE states. If, however, another REQUEST instruction is received, the alignment unit returns to the PENDING state if the GRANT signal is logic low or to the QUEUE state if the GRANT signal is logic high. The unit will remain in QUEUE as long as the GRANT signal is high and will return to PENDING when the GRANT signal goes low.

Alternatively, while in the PENDING state, if the alignment unit receives the TEST instruction while the GRANT signal is logic high, it will change to the BLOCKING state. Further operations in the BLOCKING state will be the same as described above.

Figure 5:
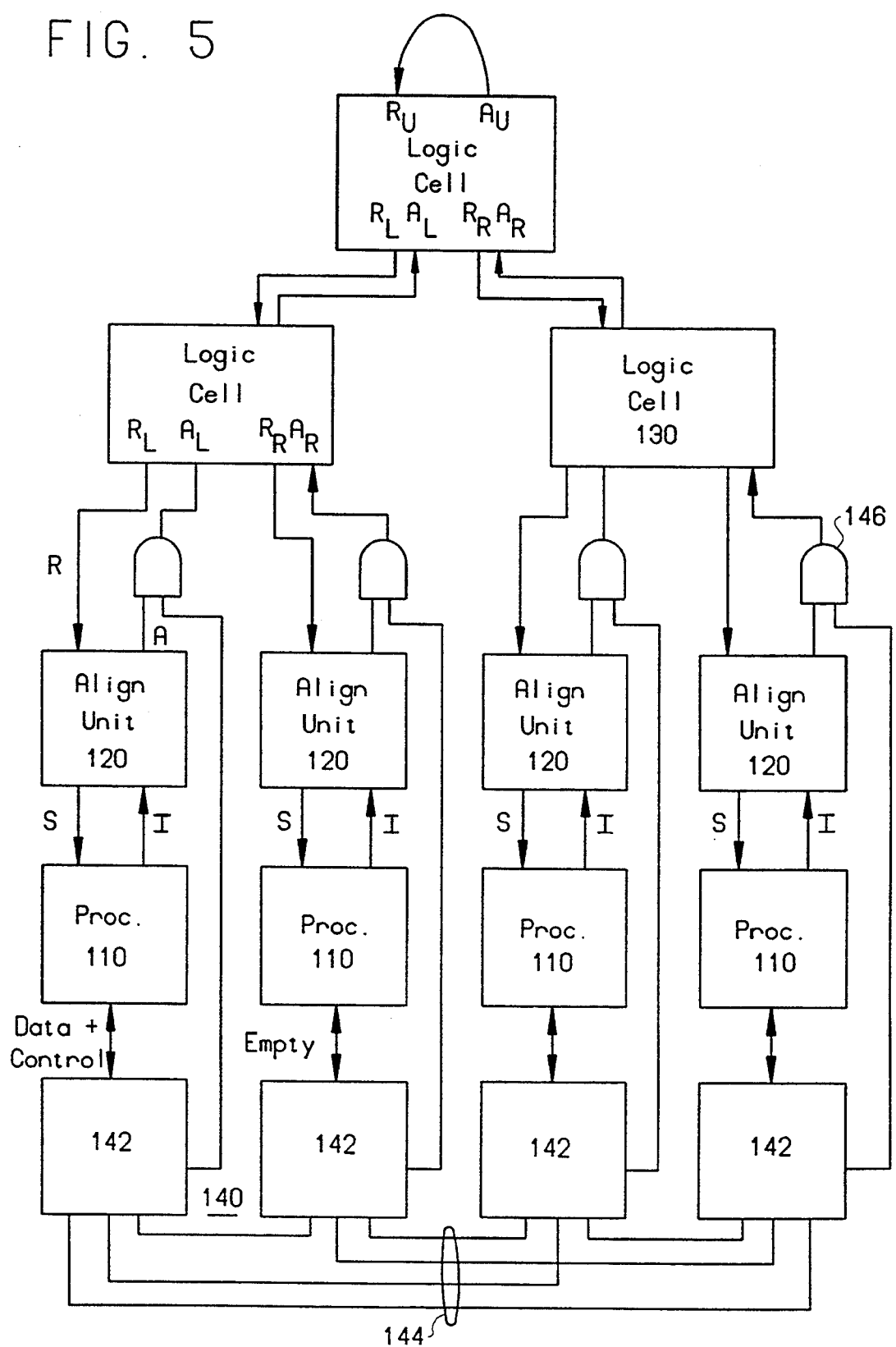
FIG. 5 is a block diagram of a second illustrative embodiment of the invention.

As alternative embodiment of the invention is disclosed in FIG. 5. As shown therein, the apparatus comprises an array of processors 110, an array of alignment units 130, an array of combinatorial logic cells 130 and an interconnection network 140. The processors 110, alignment units 120 and combinatorial logic cells 130 may be the same as processors 10, alignment units 20 and logic cells 30 of FIG. 1 and processors 110 may be controlled by a control unit that is not shown. Interconnection network 140, however, is different from that of network 40 in that it is implemented in the form of separate routers 142 and connection paths 144 between each pair of processors.

In such a case, it is possible to test for the absence of message traffic in the interconnection network by testing on a processor by processor basis. Thus as shown in FIG. 5, the router for each processor produces an output signal which is a logic high when there is no message traffic on the connection paths to or from the processor with which it is associated. This signal is applied as one input to an AND gate 146 which has as a second input the output of the alignment unit 130 associated with that processor. As a result, a high logic signal is provided by AND gate 146 to an input to logic cell 130 when there is no message traffic in the portion of the interconnection network associated with that processor and a logic high ASSERT signal has been generated by the alignment unit. As will be apparent, this changes the location of the test for no message traffic from the uppermost cell in the binary tree of logic cells 30 of FIG. 1 to the lowermost cells in the binary tree of logic cells 130 of FIG. 5. In other respects the operation of the alignment units and logic cells is the same as described for FIGS. 1-4.

The invention may be practiced in numerous environments. For example, if the processors are Intel 80386 microprocessors, the invention may be practiced using the IN and OUT instructions of the 80386 instruction set to provide instructions to an alignment unit and receive an ALIGN signal from such unit.

Illustrative code comprises:

| | | |
|---|---|---|
| 1. MOV | AL, 5 | load an address, 5, of the processor to which data is to be sent |
| 2. OUT | sending device, AL | send data via sending device |
| 3. ADD | AL, CL | compute data of message |
| 4. OUT | sending device, AL | send data via sanding device |
| 5. MOV | AL, 1 | load into AL a 1-bit representing a request for alignment |
| 6. OUT | align unit, AL | send the 1-bit in register AL to the alignment unit 20 |
| . | | |
| . | | |
| 20. IN | AL, align unit | load the ALIGN signal from the alignment unit into register AL |
| 21. TEST | AL, 1 | test if the signal in register AL is a 1-bit |
| 22. INE | 20 | if not, return to instruction at line 20 |
| 23. IN | AL, receiving device | if it is a 1-bit, proceed with program illustratively by loading signals from receiving device into register AL |

In the practice of the invention, the request for alignment is made by each processor wherever it is necessary for inter-processor communications to have been completed before the processor can continue with its program. In the illustrative code set forth above, the request for alignment is made at line 6. The requests for alignment are processed by the alignment units 20 associated with each processor and are forwarded to logic cells 30 as logic high ASSERT signals. These requests are ANDed together by logic cells 30 and when all processors have made such a request a logic high signal is applied to AND gate 60. If the interconnection network is empty, a logic high READY signal is broadcast by AND gate 60 to all the alignment units 20 via logic cells 30.

In the illustrative code set forth above, the logic level of the READY or GRANT signal is monitored by the instructions at lines 20, 21, and 22, which respectively read this signal level, test if it is a 1-bit or logic high, and recycle if the 1-bit has not been received. These instructions provide the function of the TEST instruction and the ALIGN signal of Table I.

The processors are all aligned at the time the READY signal goes logic high which occurs at some point between the request for alignment at line 6 and the time each processor initiates a successful test for a 1-bit in the AL register as at lines 20-23. It is not necessary, however, that each processor make such a test at the same time; and it is not necessary that the first such test be made after the READY signal goes logic high. If the logic high READY signal is received before the program reaches lines 20–21, the alignment unit will save that information until those lines are reached; and if the READY signal is still logic low when the program reaches line 20, the program will simply loop through the instructions at lines 20–22 until the READY signal goes logic high.

As will be apparent to those skilled in the art, numerous modifications may be made in the practice of the invention. For example, while the invention has been described in terms of apparatus (AND gate 60) which tests for completion of communication on an interconnection network, it may be desirable to make other tests in place of or in addition to such a test of the communication network. Thus, if the computer systems includes mathematics co-processors or the software includes various subroutines whose outputs might alter data to be communicated from one processor to another, it will be desirable to test such equipment or operations to make sure they have completed their tasks before issuing the READY signal to the processors. Such a test can readily be made by using a global OR network to test the state of an activity flag associated with each hardware or software element whose operation must be completed before the program can proceed.

What is claimed is:

1. A computer system comprising:
   A. a plurality of processors each for processing a separate instruction stream,
      (i) each instruction stream comprising a sequence of instructions of a plurality of diverse instruction types including an alignment request type,
      (ii) at least one instruction stream further including, situated in the instruction stream to be executed at a later point in time than the instruction of the alignment request type, at least one instruction of another type followed by an instruction of an alignment test type,
      each processor while processing an instruction of said alignment request type generating an alignment request indication, each processor while processing an instruction of said alignment test type generating an alignment test indication, each processor being inhibited from processing instructions after said instruction of the alignment test type until after it receives an alignment indication; and
   B. an alignment network for generating an alignment indication for each said processor in response to receipt therefrom of an alignment test indication following generation of alignment request indications by all of said processors.

2. A computer system as defined in claim 1 further comprising an interconnection means for transferring messages among said processors, said interconnection means further generating a status information signal indicating a selected status condition, said alignment network further generating the alignment indication for each said processor in response to said status information signal.

3. A system as defined in claim 1 in which instruction streams of all of said processors include, situated in the instruction stream to be executed at a later point in time than the instruction of the alignment request type, at least one instruction of another type followed by an instruction of an alignment test type.

4. A computer system as defined in claim 1 in which said alignment network comprises:
   A. associated with each processor:
      i. an alignment state circuit having a first state, a second state in which it generates a request for alignment, and a third state in which it generates an alignment indication;
      ii. a state control circuit for enabling said alignment state circuit to:
         a. shift from said first state to said second state to thereby generate a request for alignment in response to the associated processor receiving an instruction in its instruction stream of the alignment request type,
         b. shift from said second state to said third state to thereby generate an alignment indication in response to coincidence of the assertion of a ready signal and the processor receiving an instruction in its instruction stream of the alignment test type, and
         c. shift from said third state to said first state in response to negation of said ready signal; and
   B. coincidence test means for asserting said ready signal in response to said alignment state means associated with all of said processors generating requests for alignment, and otherwise maintaining said ready signal in a negated condition.

5. A computer system as defined in claim 4 in which said coincidence test means generates said ready signal as the coincidence of requests for alignment from all of said processors.

6. A computer system as defined in claim 5 in which said coincidence test means comprises a plurality of logic cells connected in a tree structure defining a root logic cell and a plurality of leaf logic cells, each logic cell including a coincidence circuit that generates an output signal that is coupled to its parent in response to reception of input signals from a plurality of children, each leaf cell having as input signals alignment request signals from a predetermined number of alignment state circuits and generating as an output signal an assert signal, the logic cells propagating the assert signals to the root cell, the root cell including a ready indication generating circuit for generating the ready indication for coupling to all of said alignment state control circuits.

7. A computer system as defined in claim 6 in which each logic cell further includes a latch circuit for latching the output signal from said coincidence circuit in response to a clock signal, the latch circuit generating a latched output signal that comprises the assert signal that is propagated toward the root cell.

8. A computer system as defined in claim 6 in which each logic cell further includes a ready indication distribution circuit including a latch that latches the ready indication from its parent logic cell in response to a clock signal and that transmits the latched ready indication to its children to thereby propagate the ready indication from the root logic cell to the leaf logic cells, the leaf logic cells transmitting the ready indications latched thereby to the alignment state circuits connected thereto.

9. An alignment control arrangement for use in a computer comprising a plurality of processors, each for processing a separate instruction stream,
   (i) each instruction stream comprising a sequence of instructions of a plurality of diverse instruction types including an alignment request type,
   (ii) at least one instruction stream further including, situated in the instruction stream to be executed at a later point in time than the instruction of the alignment request type, at least one instruction of another type followed by an instruction of an alignment test type, the alignment control arrangement comprising:

A. a plurality of testing means each associated with a processor responsive to the processing by the processor of an instruction from the processor's respective instruction stream for testing the instruction to determine whether it is an instruction of the alignment request type or an instruction of an alignment test type;

B. determining means for determining that all the testing means have detected an instruction of the alignment request type and for using such determination to control generation of a ready signal; and C. a plurality of inhibiting means each associated with a processor for preventing the associated processor from executing an instruction beyond an instruction of said alignment test type until said ready signal is generated by said determining means.

10. An alignment control arrangement as defined in claim 9, in which each said testing means comprises:

A. means for storing an identification of a current state of an alignment process, and B. means responsive to a ready signal, a signal representative of the executing instruction stream from said processor, and a signal representative of said current state, for generating a signal identifying a next state of the alignment process, an assert signal and a signal indicating whether alignment has been achieved.

11. An arrangement as defined in claim 9 in which instruction streams of all of said processors include, situated in the instruction stream to be executed at a later point in time than the instruction of the alignment request type, at least one instruction of another type followed by an instruction of an alignment test type.

12. An alignment control arrangement as defined in claim 9 in which said determining means generates said ready signal as the coincidence of requests for alignment from all of said processors.

13. An alignment control arrangement as defined in claim 12 in which said determining means comprises a plurality of logic cells connected in a tree structure defining a root logic cell and a plurality of leaf logic cells, each logic cell including a coincidence circuit that generates an output signal that is coupled to its parent in response to reception of input signals from a plurality of children, each leaf cell having as input signals alignment request signals from a predetermined number of alignment state circuits and generating as an output signal an assert signal, the logic cells propagating the assert signals to the root cell, the root cell including a ready indication generating circuit for generating the ready indication for coupling to all of said alignment state control circuits.

14. A alignment state control arrangement as defined in claim 13 in which each logic cell further includes a latch circuit for latching the output signal from said coincidence circuit in response to a clock signal, the latch circuit generating a latched output signal that comprises the assert signal that is propagated toward the root cell.

15. A computer system as defined in claim 13 in which each logic cell further includes a ready indication distribution circuit including a latch that latches the ready indication from its parent logic cell in response to a clock signal and that transmits the latched ready indication to its children to thereby propagate the ready indication from the root logic cell to the leaf logic cells, the leaf logic cells transmitting the ready indications latched thereby to the alignment state circuits connected thereto.

* * * * *